(12) United States Patent
Kuang

(10) Patent No.: US 10,912,377 B1
(45) Date of Patent: Feb. 9, 2021

(54) ELECTRIC TOOTHBRUSH BRUSH HEAD AND ELECTRIC TOOTHBRUSH

(71) Applicant: Juan-Yun Kuang, Shenzhen (CN)

(72) Inventor: Juan-Yun Kuang, Shenzhen (CN)

( * ) Notice: Subject to any disclaimer, the term of this patent is extended or adjusted under 35 U.S.C. 154(b) by 0 days.

(21) Appl. No.: 17/016,355

(22) Filed: Sep. 9, 2020

(30) Foreign Application Priority Data

Aug. 7, 2020 (CN) .................... 2020 2 1631331 U

(51) Int. Cl.
| | |
|---|---|
| *A46B 5/00* | (2006.01) |
| *A46B 9/04* | (2006.01) |
| *A61C 17/34* | (2006.01) |
| *A61C 17/22* | (2006.01) |
| *A46B 13/02* | (2006.01) |

(52) U.S. Cl.
CPC ............ *A46B 5/0095* (2013.01); *A46B 5/002* (2013.01); *A46B 9/04* (2013.01); *A46B 13/023* (2013.01); *A61C 17/222* (2013.01); *A61C 17/3481* (2013.01)

(58) Field of Classification Search
CPC ..... A61C 17/3481; A61C 17/32; A61C 17/34; A61C 17/222; A46B 5/0095
See application file for complete search history.

(56) References Cited

U.S. PATENT DOCUMENTS

| | | |
|---|---|---|
| 8,782,841 B2 | 7/2014 | Sale et al. |
| 9,724,180 B1 | 8/2017 | Liu |
| 9,827,079 B1 | 11/2017 | Liu |
| 2005/0108838 A1* | 5/2005 | Schaefer ................ A61C 17/22 15/22.1 |
| 2015/0082560 A1 | 3/2015 | Graeve |

\* cited by examiner

*Primary Examiner* — Shay Karls
(74) *Attorney, Agent, or Firm* — ScienBiziP, P.C.

(57) ABSTRACT

The present disclosure provides a brush head of an electric toothbrush, which is detachably attached to a handle of the electric toothbrush, and the handle includes a drive shaft. The brush head includes a brush head main body, and the brush head main body has a receiving cavity along a first direction. The receiving cavity accommodates at least a part of the drive shaft. The brush head main body includes a cavity wall forming the receiving cavity and an abutment wall. The cavity wall and the abutment wall are integrally formed. When the electric toothbrush brush head is in an assembled state, the abutment wall abuts against the drive shaft under an external force. The brush head includes an elastic member. The elastic member is arranged at a position corresponding to the abutment wall.

20 Claims, 14 Drawing Sheets

US 10,912,377 B1

ELECTRIC TOOTHBRUSH BRUSH HEAD AND ELECTRIC TOOTHBRUSH

RELATED APPLICATIONS

This application claims the benefit of priority to Chinese Patent Application Number 202021631331.2 filed on Aug. 7, 2020. The entire contents of the above-identified application are hereby incorporated by reference.

TECHNICAL FIELD

The disclosure relates to the technical field of electric toothbrush, and particularly relates to a brush head for an electric toothbrush.

BACKGROUND

While living standards continue to improve, people are increasingly concerned about their health, for example, health of their teeth, thus, electric toothbrushes are increasingly widespread.

Currently, commercially available electric toothbrushes usually lean towards two methods to control bristles' motion on a brush head: one being an electric toothbrush in which the bristles are rotated and vibrated by a motor, and the other being an ultrasonic electric toothbrush that causes high-frequency vibration of the brush head. The electric toothbrushes in these two methods usually make the bristles vibrate to achieve the purpose of teeth cleaning. The brush head and a handle of an electric toothbrush are generally designed to be detachable for subsequent replacement of the brush head. A drive rod of a brush handle is connected to the brush head, and transmits the energy required for the vibration of the brush head to the brush head that needs vibration. Vibration occurs between the brush handle and the brush head, which requires the brush handle and the brush head not to separate during vibration.

To meet the requirement above, prior art typically uses an additional connection that usually fixedly connect the brush handle to the brush head. A connecting piece may have a shape matching a receiving cavity of the brush head for receiving the drive shaft so as to be completely received by and fixed in the receiving cavity of the brush head for receiving the drive shaft. During assembly, it is necessary to insert and fix the connecting piece into the receiving cavity of the brush head. When assembling the brush head and the brush handle, the drive shaft of the brush handle is inserted into the connecting piece, so that the brush head and the brush handle are fixed by the connecting piece. As such, because the brush head and the brush handle are fixed by the connecting piece, falloff or offset may occur between the brush head and the brush handle during use, and the additional connecting piece, of which material is different from the brush head, is required, so that the connecting piece needs to be manufactured independently, thus increasing manufacturing costs. Therefore, there is room for improvement in the art.

BRIEF DESCRIPTION OF DRAWINGS

Implementations of the present disclosure will now be described, by way of embodiment, with reference to the attached figures.

DETAILED DESCRIPTION

Figure 1:
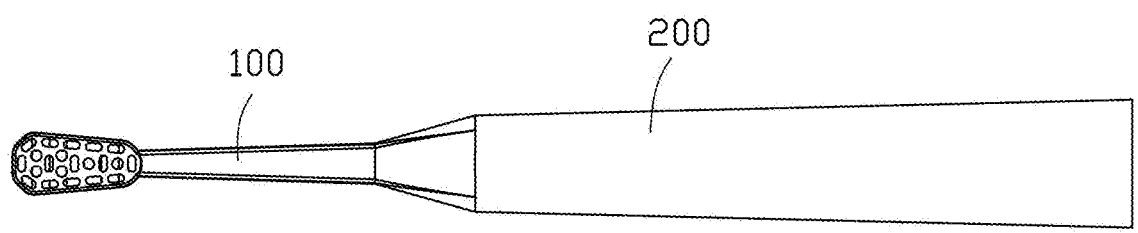
FIG. 1 is a front view showing an electric toothbrush according to one embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references may mean "at least one".

Figure 2:
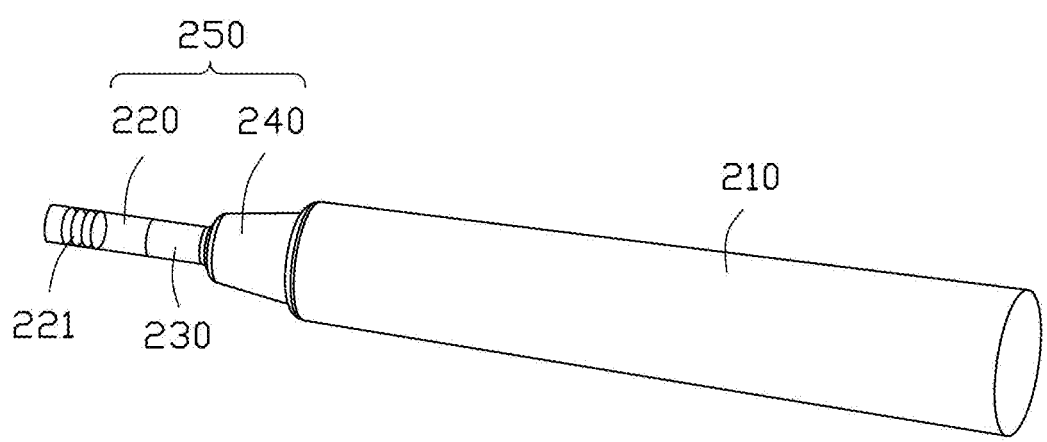
FIG. 2 is an exploded view showing a handle of the electric toothbrush shown in FIG. 1 according to the present disclosure.

Referring to FIGS. 1 and 2, the electric toothbrush 300 includes a handle 200 and the above-mentioned electric toothbrush brush head 100, the electric toothbrush brush head 100 is detachably attached to the handle 200 of the electric toothbrush 300. The handle 200 adopts publicly known technologies, including a housing 210, a motor (not shown), a control board (not shown), and a battery (not shown) placed in the housing 210. The motor has a vibrating drive shaft 250, the drive shaft 250 extending from the handle 200. The electric toothbrush brush head 100 is detachably inserted on the drive shaft 250.

Figure 3:
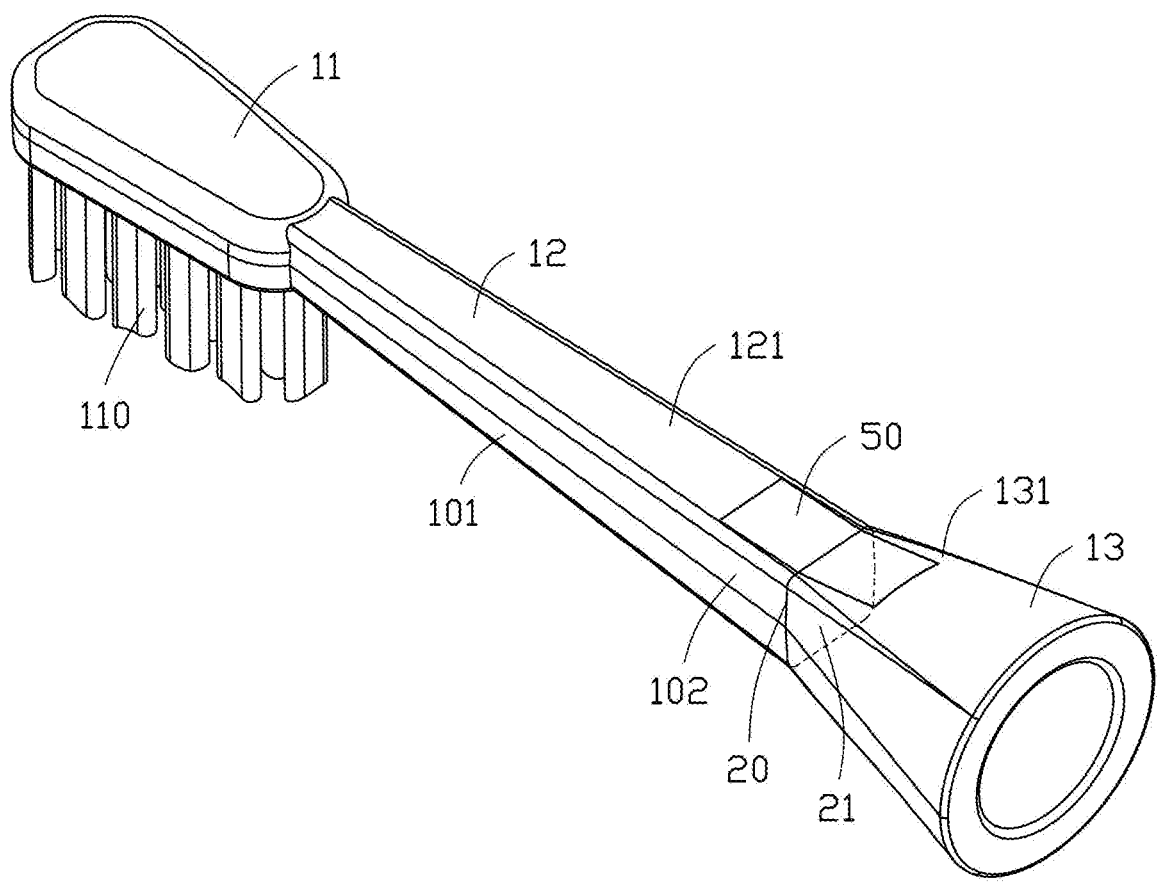
FIG. 3 is a perspective structural view showing a brush head of the electric toothbrush of FIG. 1 according to the present disclosure.
Figure 4:
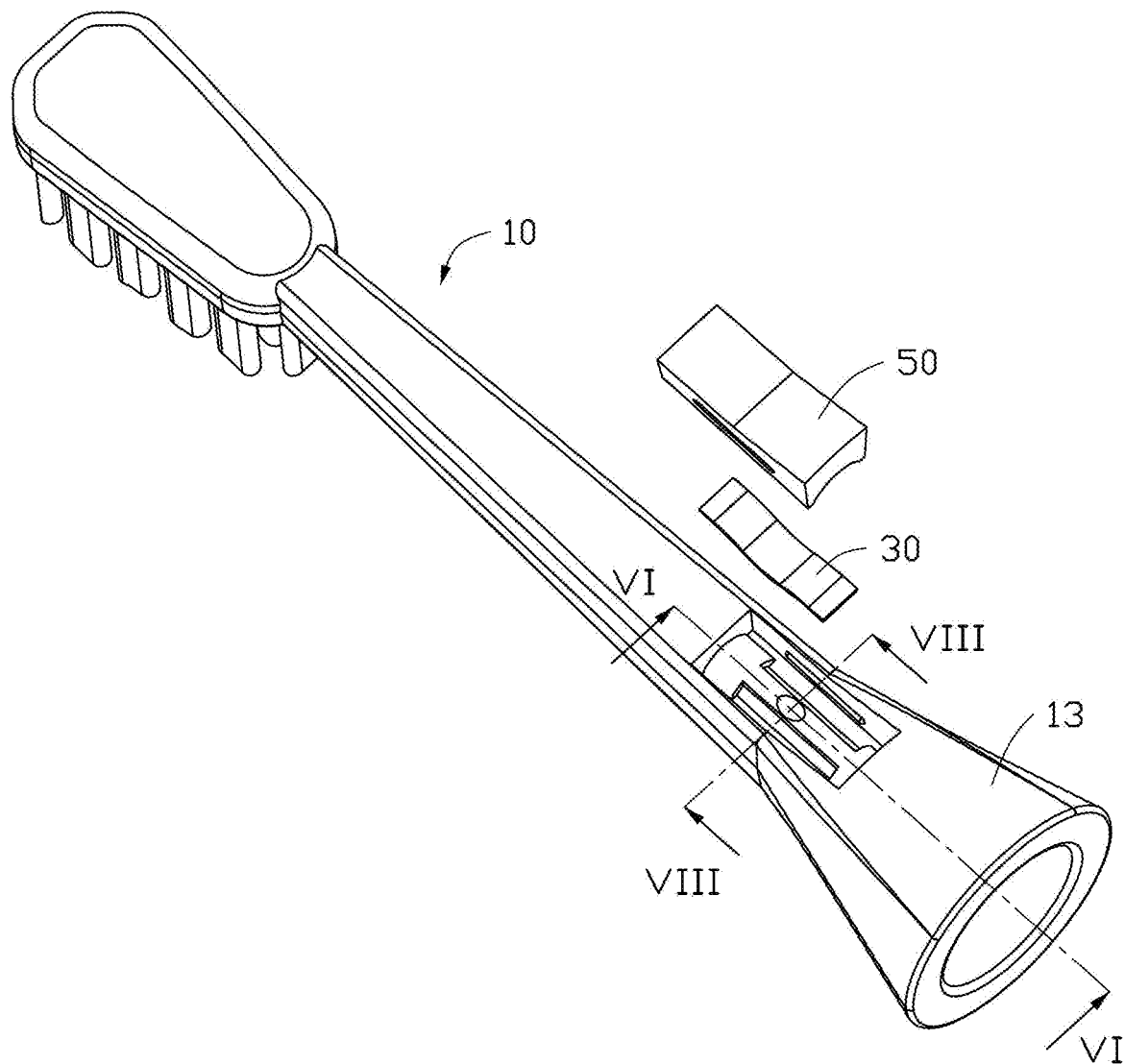
FIG. 4 is an exploded view of the brush head of the electric toothbrush shown in FIG. 3. according to the present disclosure

In the present embodiment, referring to FIGS. 3 and 4, the electric toothbrush brush head 100 includes a brush head main body 10, an elastic member 30, and an engaging member 50. The elastic member 30 and the engaging member 50 both are received in the brush head main body 10.

Referring to FIG. 3, the brush head main body 10 includes a bristle carrier 11, a neck portion 12 and an insertion portion 13. The bristle carrier 11 and the insertion portion 13 are respectively located at two ends of the neck portion 12. The brush head main body 10 is made of ABS plastic, PP plastic or POM plastic. In other embodiments, the brush head main body 10 may also be made of other plastic materials or other non-plastic material, but are not limited to the examples provided in the present disclosure. Using the above materials will increase the safety and the elasticity of the brush head main body 10.

The neck portion 12 has an elongated rod-shaped structure, which is approximately a rectangular parallelepiped shape, and the insertion portion 13 has an approximately truncated conical shape. In other embodiments, the neck portion 12 may also be approximately cylindrical, and the insertion portion 13 may also have other shapes, and the present disclosure does not specifically limit the shapes thereof.

The bristle carrier 11 is provided with a plurality of bristle bundles 110 to clean teeth and oral cavities.

Referring to FIG. 4, the brush head main body 10 is provided with a receiving cavity 14 in a first direction X', and the receiving cavity 14 is configured to receive at least a part of the drive shaft 250. The first direction X' is the direction along an end of the brush head main body 10 connected to the handle 200 toward another end of the brush head main body 10 away from the handle 200, that is, the direction along the insertion portion 13 toward the bristle carrier 11. In the present embodiment, the receiving cavity 14 is configured for receiving the first metal portion 220 of the drive shaft 250. The receiving cavity 14 is provided at a junction of the neck portion 12 and the insertion part 13.

Figure 5:
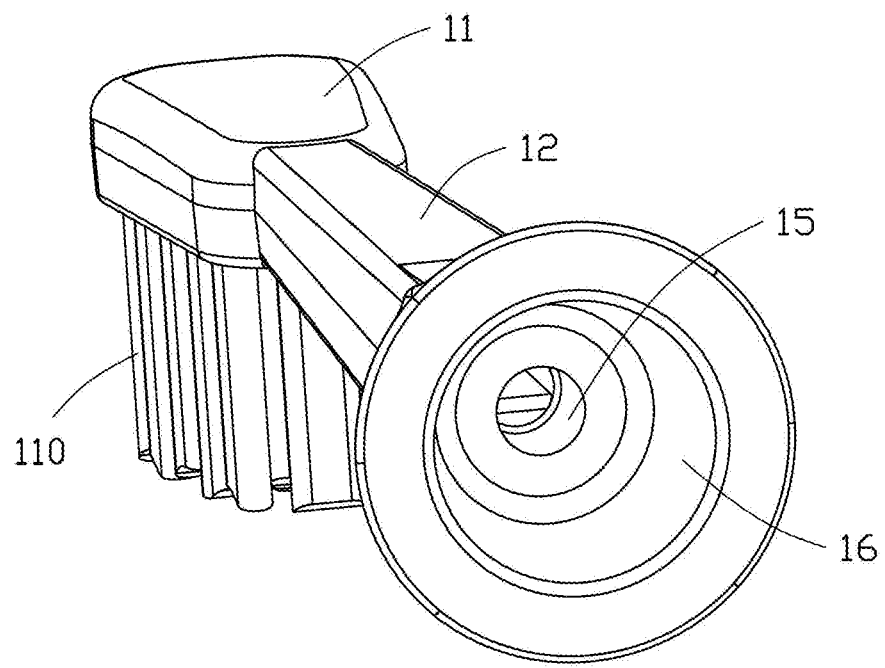
FIG. 5 is a perspective view of the brush head of the electric toothbrush shown in FIG. 3 from another angle according to the present disclosure.
Figure 6:
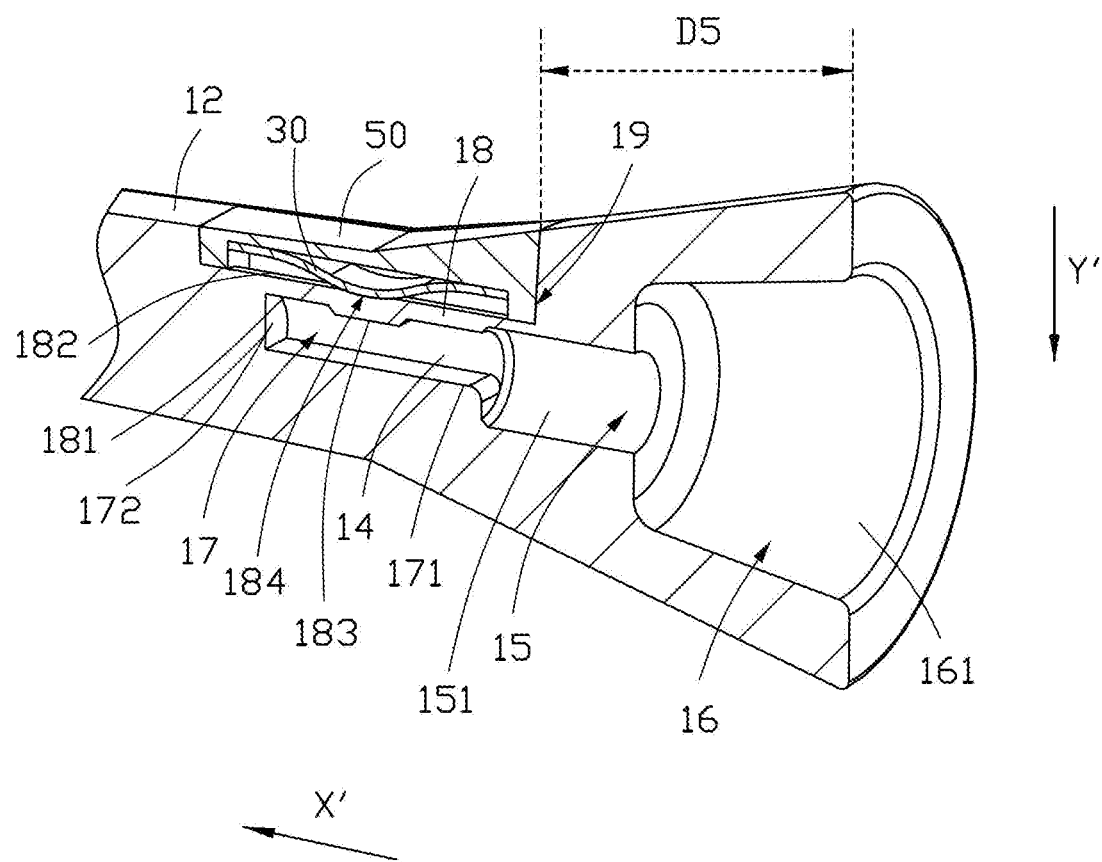
FIG. 6 is a cross-sectional view of a portion of the brush head shown in FIG. 4 taken along the line VI-VI according to the present disclosure.

Further with reference to FIGS. 5 and 6, the brush head main body 10 is further formed with a first receiving chamber 15 and a second receiving chamber 16 along the first direction X'. The receiving cavity 14 and the second receiving chamber 16 are respectively located at two ends of the first receiving chamber 15, the second receiving chamber 16 is located at an end of the insertion portion 13 close to the handle 200. The first receiving chamber 15 and the second receiving chamber 16 are in air communication and respectively receive the metal rod 230 and the fixing portion 240 of the handle 200.

In the present embodiment, the metal rod 230 does not contact an inner surface 151 of the first receiving chamber 15 and the fixing portion 240 does not contact an inner surface 161 of the second receiving chamber 16 of the drive shaft 250 to prevent the drive shaft 250 from driving the electric toothbrush brush head 100 to vibrate.

Referring to FIGS. 2 and 6, the brush head main body 10 also includes a cavity wall 17 and an abutment wall 18 forming the receiving cavity 14. The cavity wall 17 and the abutment wall 18 are integrally formed. When the electric toothbrush brush head 100 is in an assembled state, the abutting wall 18 abuts the first metal portion 220 of the drive shaft 250 under external force.

In the present embodiment, the first metal portion 220 is provided with a pattern 221, and the abutment wall 18 abuts the pattern 221, which enhances friction between the drive shaft 250 and the electric toothbrush brush head 100 so as to increase a connection therebetween.

Referring to FIGS. 4 and 6, the electric toothbrush brush head 100 provided by the present disclosure abuts the abutment wall 18 through the elastic member 30, which may provide the abutment wall 18 with the external force to abut the drive shaft 250. In this way, by providing the elastic member 30, when the drive shaft 250 of the handle 200 is inserted into the receiving cavity 14, frictional force between the abutment wall 18 and the drive shaft 250 may effectively increase, so that the electric toothbrush brush head 100 and the handle 200 may be connected in a more firmly way and not fall off so easily, and cushioning force caused by the elastic member 30 may effectively reduce noise. In addition, with the elastic member 30 and the abutment wall 18, the drive shaft 250 is firmly engaged in the receiving cavity 14, so that the drive shaft 250 and the convex portion 183 of the abutment wall 18 fit more closely, thereby improve the vibration performance of the electric toothbrush brush head 100.

In addition, the electric toothbrush brush head 100 of the present disclosure is directly attached to the handle 200 of the electric toothbrush 300, and no additional connecting pieces and other structures are required. Therefore, only the connection between the electric toothbrush brush head 100 and the handle 200 need to be considered during the assembly process, which effectively prevents the offset between the electric toothbrush brush head 100 and the handle 200, thereby providing the stability of the electric toothbrush 300 during use, and the aesthetics of the electric toothbrush 300. Moreover, in the present embodiment, the brush head main body 10 is integrally molded, that is, the abutment wall 18 and the cavity wall 17 are integrally formed, which may effectively simplify the manufacturing process and reduce manufacturing cost.

Figure 7:
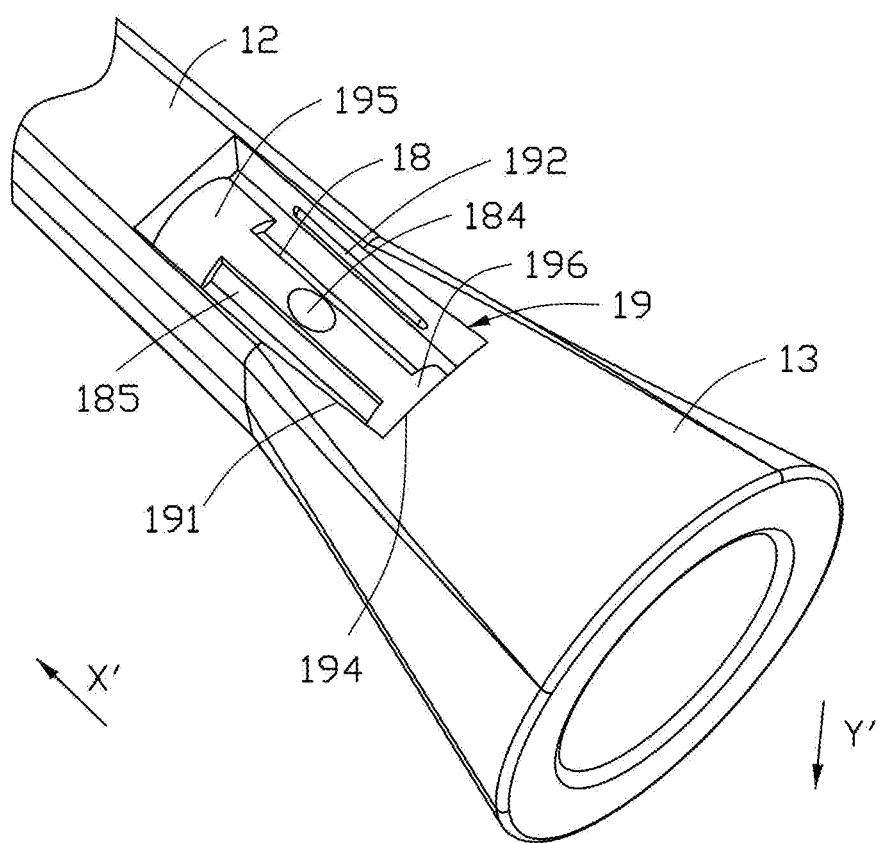
FIG. 7 is a partial view of a main body of the brush head shown in FIG. 3 according to the present disclosure.

Further with reference to FIGS. 6 and 7, one of the outer surfaces of the brush head main body 10 is provided with an accommodating cavity 19 at a position corresponding to the receiving cavity 14, the accommodating cavity 19 and the receiving cavity 14 are spaced apart by the abutment wall 18, and the accommodating cavity 19 is configured for accommodating the engaging member 50 and the elastic member 30.

In other embodiments, accommodating cavities 19 are provided on two outer surfaces of the receiving cavity 14 opposite to each other, and an engaging member 50 and an elastic member 30 are provided in each accommodating cavity 19 to further strengthen the connection between the electric toothbrush brush head 100 and the handle 200.

The accommodating cavity 19 may be arranged inwards from any outer surface of the brush head main body 10, and therefore the elastic member 30 abuts the first metal portion 220 of the drive shaft 250, thereby stably locking the drive shaft 250 to receiving cavity 14.

Referring to FIGS. 3 and 6, the neck portion 12 includes a first surface 121, the insertion portion 13 includes a second surface 131, and the accommodating cavity 19 is provided at the junction of the first surface 121 and the second surface 131.

Referring to FIG. 6, the abutment wall 18 includes a first wall surface 181 and a second wall surface 182 disposed opposite to each other. The first wall surface 181 is a surface of the abutment wall 18 facing the receiving cavity 14, and is convexly provided with a convex portion 183. The convex portion 183 is configured to abut the first metal portion 220 of the drive shaft 250.

The convex portion 183 protrudes from the first wall surface 181 of the abutment wall 18, when elastic force of the elastic member 30 applies toward the abutment wall 18, the abutment wall 18 may transfer the applied elastic force to abut and further firmly lock the drive shaft 250 to receiving cavity 14, which prevent the electric toothbrush brush head 100 from falling off the handle 200, and vibrations of the electric toothbrush brush head 100 may be further stabilized and quiet.

The second wall surface 182 is the surface of the abutment wall 18 facing the accommodating cavity 19, that is, the surface of the abutment wall 18 faces away from the receiving cavity 14. The second wall surface 182 is formed with a convex portion 184, at least a part of the elastic member 30 abuts the concave portion 184, and the position of the convex portion 183 corresponds to the position of the concave portion 184.

Specifically, at least a part of the elastic member 30 abuts the concave portion 184 on the second wall surface 182, so that the elastic force of the elastic member 30 may be directed at the concave portion 184 of the abutment wall 18, and the abutment wall 18 may transfer the applied elastic force to lock the drive shaft 250. In this way, the electric toothbrush brush head 100 is prevented from falling off, and the vibrations of the electric toothbrush brush head 100 may be further stabilized and quiet.

As described above, the brush head main body 10 and the handle 200 are connected. The handle 200 drives the vibration of the electric toothbrush brush head 100. The structure for connecting the brush head main body 10 and the handle 200 is simple, and no additional connecting pieces are required. Therefore, the electric toothbrush brush head 100 has a simple structure, is easy to manufacture, and has low manufacturing cost.

Figure 8:
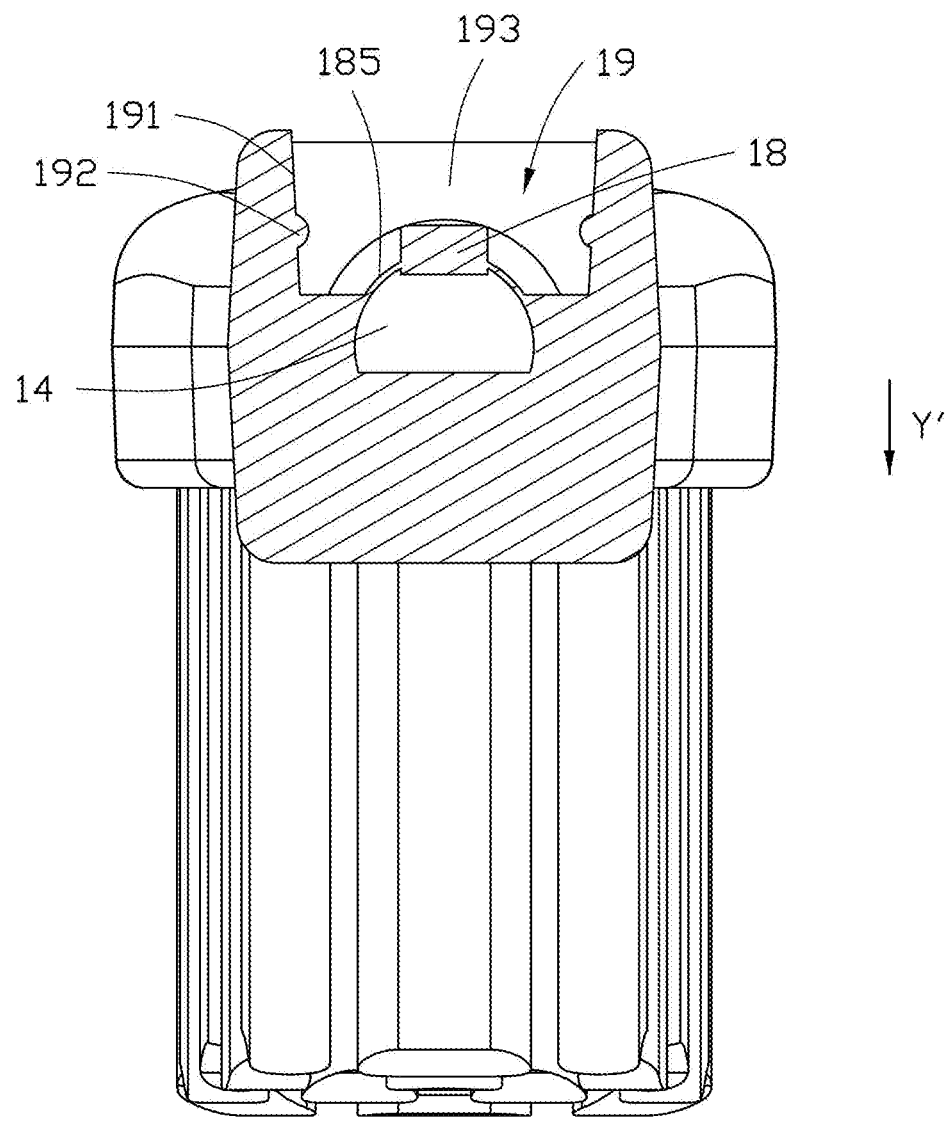
FIG. 8 is a cross-sectional view of the brush head of the electric toothbrush shown in FIG. 4 along the line VIII-VIII according to the present disclosure.

With reference to FIGS. 7 and 8, in the present embodiment, the two sides of the abutment wall 18 are connected to the cavity wall 17 by an isolation layer 185, and the thickness of the isolation layer 185 is smaller than the thickness of the abutment wall 18.

The thickness of the isolation layer 185 ranges from about 0.05 to 2.0 mm, for example, 0.08 mm, 0.1 mm, 1.5 mm, etc. The length of the abutment wall 18 is about 2.0-13.5 mm, for example, 4.0 mm, 8.5 mm, 10 mm, etc. The width of the abutment wall 18 is in the range of about 0.5-5.3 mm, for example 0.8 mm, 1.5 mm, 4.0 mm, etc. The thickness of the abutment wall 18 is in the range of about 0.1-2.0 mm, for example, 0.3 mm, 0.6 mm, 1.5 mm, etc.

With the isolation layer 185 of the above-mentioned size provided between the abutment wall 18 and the cavity wall 17, the vibration of the abutment wall 18 is not affected, and foreign matters such as water and dust in the accommodating cavity may be further prevented from entering the receiving cavity 14.

Another embodiment of the present disclosure will be described below with reference to FIGS. 9 to 10. Note that, for convenience of explanation, the same reference signs are assigned to components having the same function as those described in the above-described embodiment, and description thereof is omitted.

A slit 186 is provided between the two sides of the abutment wall 18 and the cavity wall 17.

The abutment wall 18 has flexibility thus it allows for easy removal of the abutment wall 18 from the molding during the manufacturing process, which may reduce the cost of the mold and thereby reduce the manufacturing cost.

In the present embodiment, with reference to FIG. 6, the cavity wall 17 further includes a first limiting wall 171 and a second limiting wall 172. The first limiting wall 171 is disposed opposite to the abutment wall 18, and the first limiting wall 171 may effectively prevent the drive shaft 250 from shaking or rotating when the first metal portion 220 of the drive shaft 250 is received in the receiving cavity 14. The second limiting wall 172 and the first limiting wall 171 are arranged perpendicularly to prevent the drive shaft 250 from moving in the first direction X'.

The elastic member 30 is received in the engaging member 50 and is disposed opposite to the abutment wall 18, so as to abut the abutment wall 18 along the direction of the outer surface of the cavity wall 17 toward the receiving cavity 14. The abutment wall 18 is thereby provided with the external force to abut the drive shaft 250.

With the elastic member 30 as described above to abut the abutment wall 18, sufficient external force is applied to the abutment wall 18 to abut the drive shaft 250.

Figure 11:
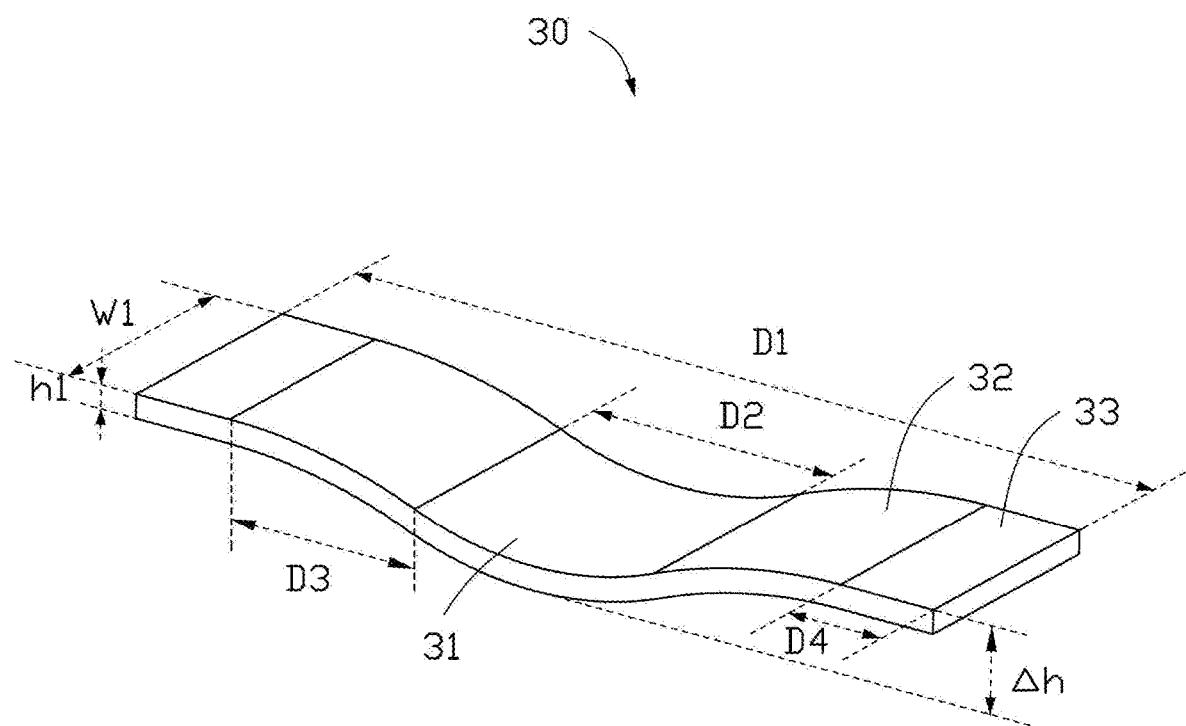
FIG. 11 is a perspective view of an elastic member of the brush head in FIG. 1 elastic member.
Figure 12:
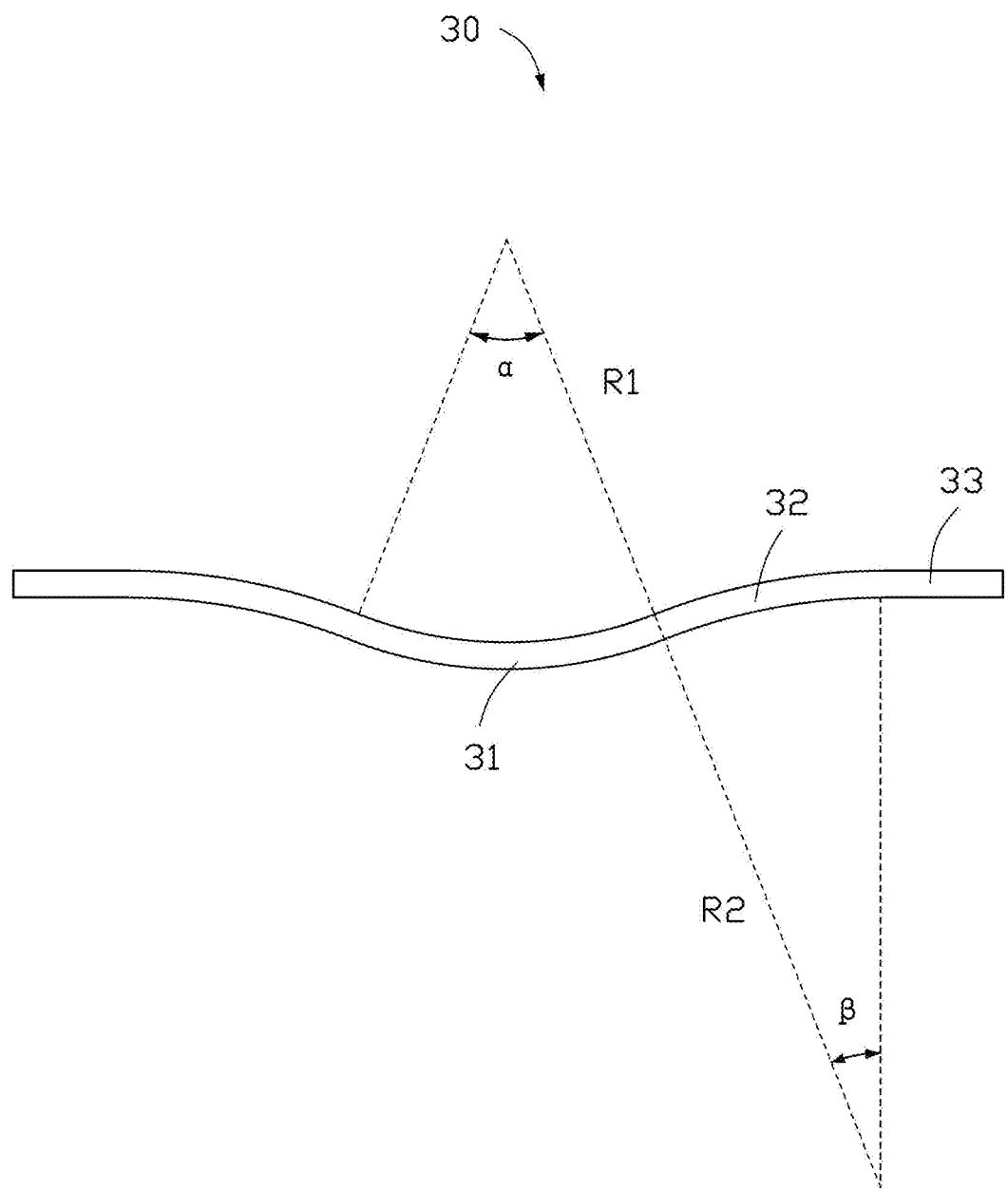
FIG. 12 is a side view of the elastic member shown in FIG. 11 elastic member.

With reference to FIGS. 11 and 12, in the present embodiment, the elastic member 30 has a sheet structure, specifically, the elastic member 30 is a curved sheet. The elastic member 30 includes a first curved surface portion 31, two second curved surface portions 32, and two flat surface portions 33. Two second curved surface portion 32 are respectively located at both ends of the first curved surface portion 31, and two flat surface portions 33 are respectively located at two ends of the second curved surface portion 32 away from the first curved surface portion 31. The first curved surface portion 31 and the second curved surface portion 32 have an arc-shape, and the first curved surface portion 31 is curved in a direction opposite to a curved direction of the second curved surface portion 32.

With such a shape, the elasticity of the elastic member 30 is provided, the engagement strength is provided, which prevents the electric toothbrush head 100 from falling off in practical applications, maintains stable vibration, therefore reduces vibration noise, and increases durability and longevity.

In the present embodiment, referring to FIG. 12, a radius R1 of a curve where the first curved surface portion 31 is located is about 2-10 mm, and a first central angle α corresponding to the first curved surface portion 31 is in the range of about 38-48 degrees. A radius R2 of a curve where the second curved surface portion 32 is located is about 3-10 mm, and a second central angle β corresponding to the second curved surface portion 32 is in the range about 15-30 degrees.

By selecting the shape as described above and the two-sided flat surface portions 33 as supporting points, sufficient resilience may be generated when the first curved surface portion 31 is under stress. If the arc of the first curved surface portion 31 and/or the second curved surface portion 32 of the elastic member 30 is too large or too small, it is difficult to achieve the desired elastic force, making the engaging strength insufficient, and the electric toothbrush head 100 would fall off easily in practical applications. In the present disclosure, the use of the above-mentioned elastic member 30 provides the elastic force of the elastic member 30 and the engaging strength between the brush head 100 and the drive shaft 250, which prevents the electric toothbrush brush head 100 from falling off in practical applications. The electronic toothbrush of the present disclosure provides stable and low-noise vibrations as well as a long-life span.

Referring to FIG. 11, a range of a linear distance D1 between the mutually distant ends of the two flat surface portions 33 in the elastic member 30 ranges from about 8.0 mm to 15.0 mm, for example 10 mm, 11 mm, 13 mm, etc. A thickness h1 of the elastic member 30 ranges from about 0.15 to 0.5 mm, for example, 0.2 mm, 0.3 mm, etc. A width w1 of the elastic member 30 ranges from about 0.5 to 7.0 mm, for example 3.0 mm, 4.0 mm, 5.0 mm, etc.

In the present embodiment, a ratio of the distance D2 between two ends of the first curved surface portion 31 is in the range of about 20-40%, and a sum of a distance D3 of the two second curved surface portions 32, that is, the ratio of 2×D3 is in the range of about 37-57%, and a sum of the proportions of a distance D4 between the two plane portions 33, that is, the proportion of 2×D4 is in the range of about 13%-33%.

In addition, a height difference Δh between the flat surface portion 33 and the first curved surface portion 31 ranges from about 0.5 mm to 1.0 mm.

In other embodiments, the distance between two ends of the elastic member 30, the distance of the first curved surface portion 31, the second curved surface portion 32, and the flat surface portion 33 may be adjusted accordingly as required.

The first curved surface portion 31 of the elastic member 30 abuts the concave portion 184 so as to apply an external force to the abutment wall 18.

The convex portion 183 abuts the pattern 221 on the drive shaft 250 of the handle 200, and the first curved surface portion 31 of the elastic member 30 abuts the concave portion 184, the elastic force of the elastic member 30 is directed at the concave portion 184 and then abuts the drive shaft 250 so as to prevent the elastic force from spreading in other directions.

The material of the elastic member 30 may be beryllium copper or stainless steel. In other embodiments, the elastic member 30 may also be made of other materials, and the present disclosure does not specifically limit the materials thereof. By selecting the above-mentioned materials, the elastic force of the elastic member 30 may be provided as well as the engaging strength between the brush head 100 and the drive shaft 250.

Figure 10:
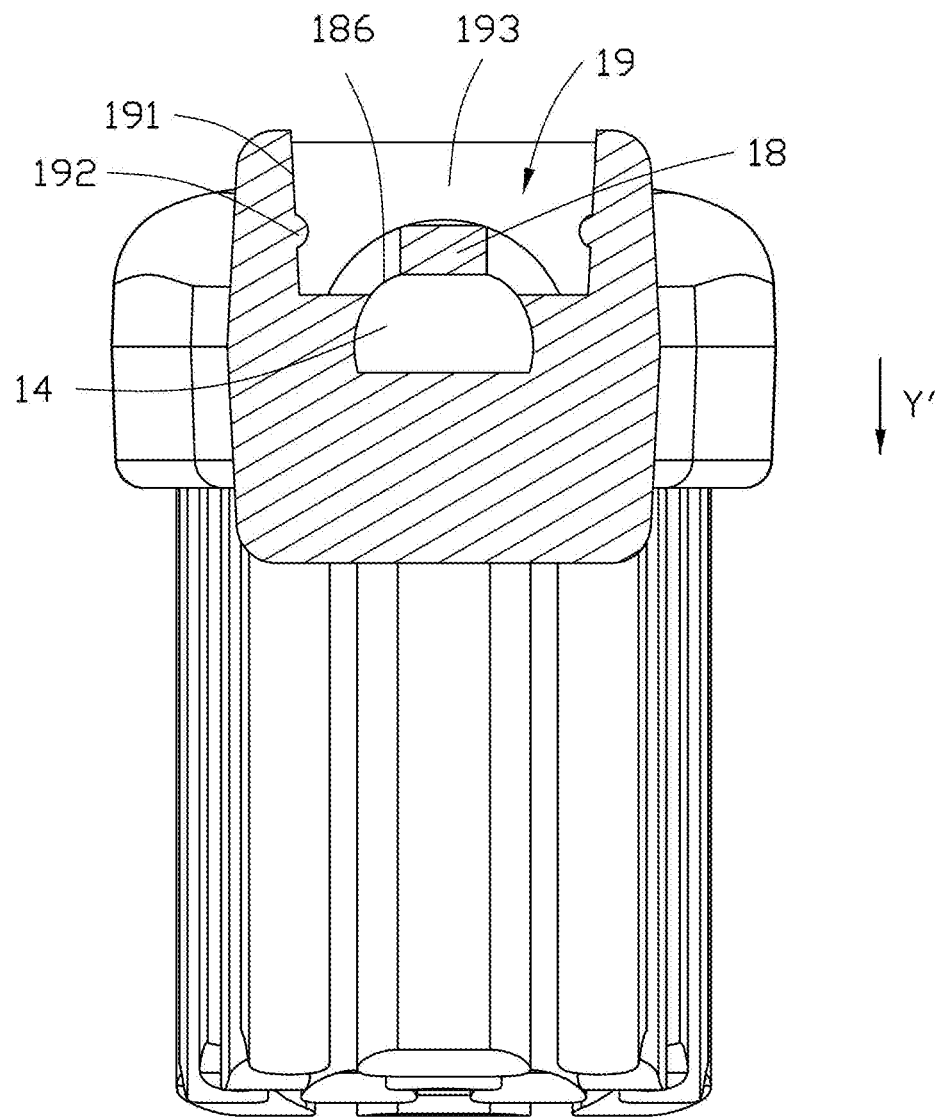
FIG. 10 is a cross-sectional view of the brush head shown in FIG. 9 along line X-X according to the present disclosure.
Figure 13:
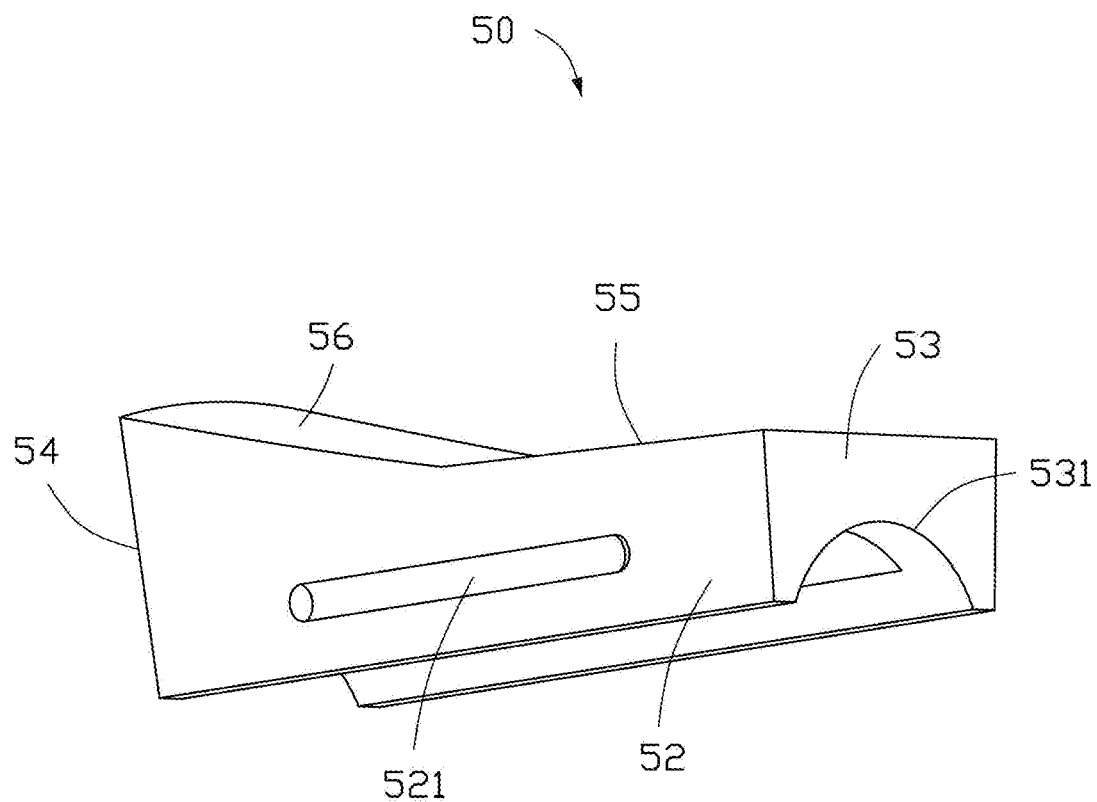
FIG. 13 is a perspective view of an engaging member of the brush head in FIG. 1 according to the present disclosure.
Figure 14:
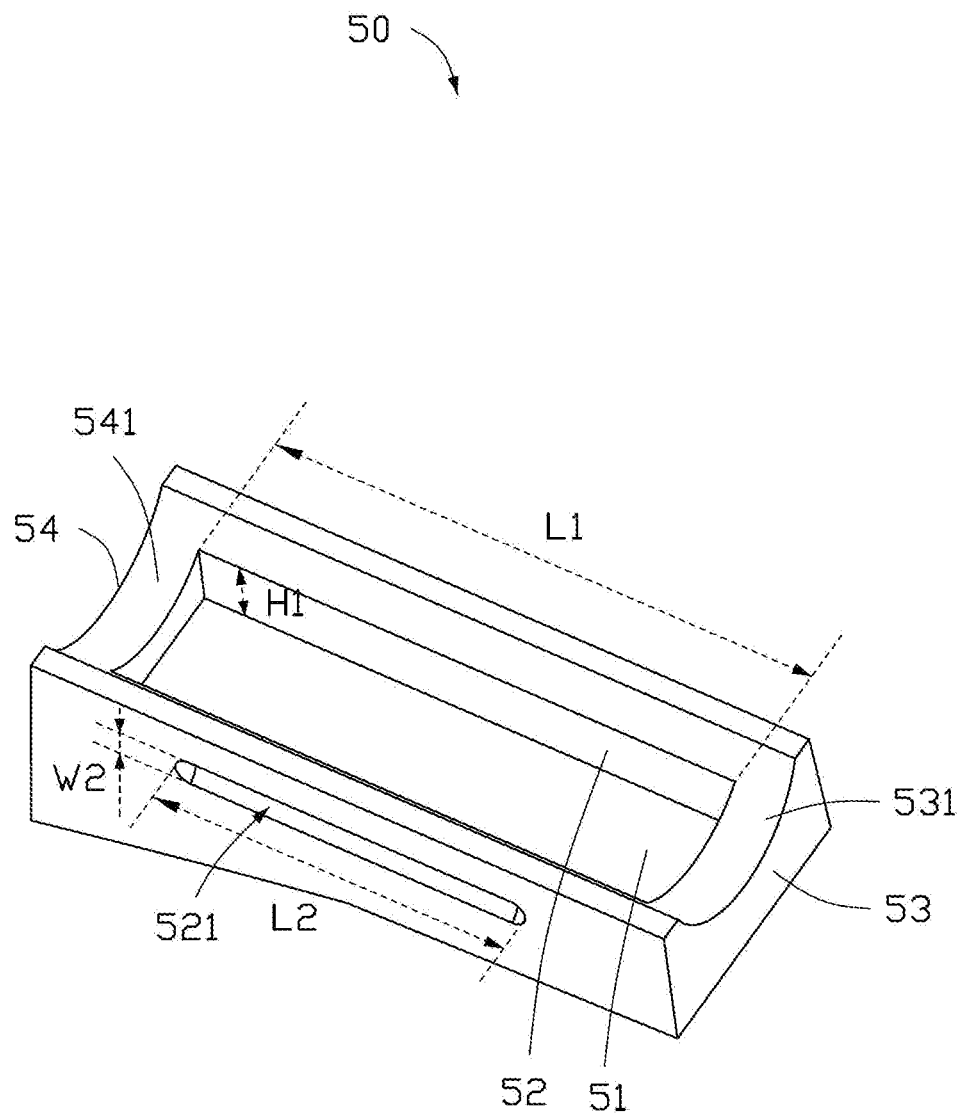
FIG. 14 is another perspective view of the engaging member shown in FIG. 13.

With reference to FIGS. 10, 13, and 14, the engaging member 50 is engaged in the accommodating cavity 19. In the present embodiment, the engaging member 50 has an accommodating groove 51 that is used for accommodating the elastic member 30, which has a sheet structure, and two ends of the sheet structure of the elastic member 30 abut against two ends of the accommodating groove 51, which allows the elastic member 30 to generate a sufficient resilience force when it is subjected to force.

Referring to FIGS. 10 and 14, the accommodating cavity 19 includes two opposite first inner walls 191, each first inner wall 191 includes an engaging portion 192 protruding therefrom along the first direction X', and the engaging member 50 includes two first side walls 52 arranged opposite to each other. Each of the first side walls 52 is provided with an engaging groove 521 on an outer surface of the first side wall 52, in which the engaging portion 192 is engaged. In this way, the engaging member 50 may be easily and firmly engaged in the accommodating cavity 19.

With reference to FIG. 14, a length L2 of the engaging groove 521 of the engaging member 50 ranges from about 5 mm to 13 mm, for example 7.0 mm, 10 mm, etc. A width W2 ranges from about 0.2 mm to 1.5 mm, for example 0.6 mm, 1.2 mm, etc. It is understood that the size of the engaging portion 192 matches the engaging groove 521 so as to be able to engage the engaging portion 192 in the engaging groove 521.

The engaging portion 192 is located on the side of the first inner wall 191 close to the cavity wall 17. Correspondingly, the engaging groove 521 is located on the side of the first side wall 52 close to the cavity wall 17 in the assembled state, so that the engaging portion 192 may be more stably engaged in the engaging groove 521.

In this way, the engaging member 50 may be firmly engaged in the accommodating cavity 19. The engaging member 50 may be fixed in the accommodating cavity 19 in other ways, for example, by ultrasonic welding.

The engaging portion 192 is in the shape of a strip (e.g., FIG. 7), and an arc transition surface is formed between the outer surfaces of the engaging portions 192 adjacent to each other, which allows for easy removal of the engaging portion 192 from the molding during the manufacturing process and lowers molding costs. In other embodiments, the engaging portion 192 may also be any other shape that allows for ease of engagement, however, is not limited to the examples provided in the present disclosure.

It is understood that in other embodiments, the outer surface of the engaging member 50 may be provided with any other desired patterns, shapes, colors, etc., but is not limited to the examples provided in the present disclosure.

Furthermore, the two first inner walls 191 of the accommodating cavity 19 are arranged obliquely along the second direction Y' and approaching each other, the angle between the first inner walls 191 and a plane perpendicular to the first direction X' ranges from 3 to 5 degrees, for example, 3.5 degrees, 4 degrees, etc. The first side wall 52 and the first inner wall 191 are inclined. The second direction Y' is in a direction from an outer surface of the accommodating cavity 19 provided in the brush head main body 10 towards an interior of the brush head main body 10.

Referring to FIGS. 7, 8, and 13, the accommodating cavity 19 further includes a second inner wall 193 and a third inner wall 194 disposed oppositely, and the engaging member 50 further includes a second side wall 53 and a third side wall 54 disposed oppositely. The outer surface of the second side wall 53 is arranged toward the second inner wall 193, the outer surface of the third side wall 54 is arranged toward the third inner wall 194, the second inner wall 193 and the third inner wall 194 are arranged obliquely along the second direction Y' and close to each other. The angles between the second inner wall 193 and the plane perpendicular to the first direction X' and the angle between the third inner wall 194 and the plane perpendicular to the first direction X' are both in the range of 3-5 degrees, the second side wall 53 and the second inner wall 193 are inclined, and the third side wall 54 and the third inner wall 194 are inclined.

In the present embodiment, such an inclined arrangement is provided, and it may play a certain guiding role, thereby facilitating assembly, expediting the installation speed, and reducing the assembly cost. In alternative embodiments, the first inner wall 191 and the second inner wall 193 may not be inclined but are not limited to examples provided herein.

Figure 9:
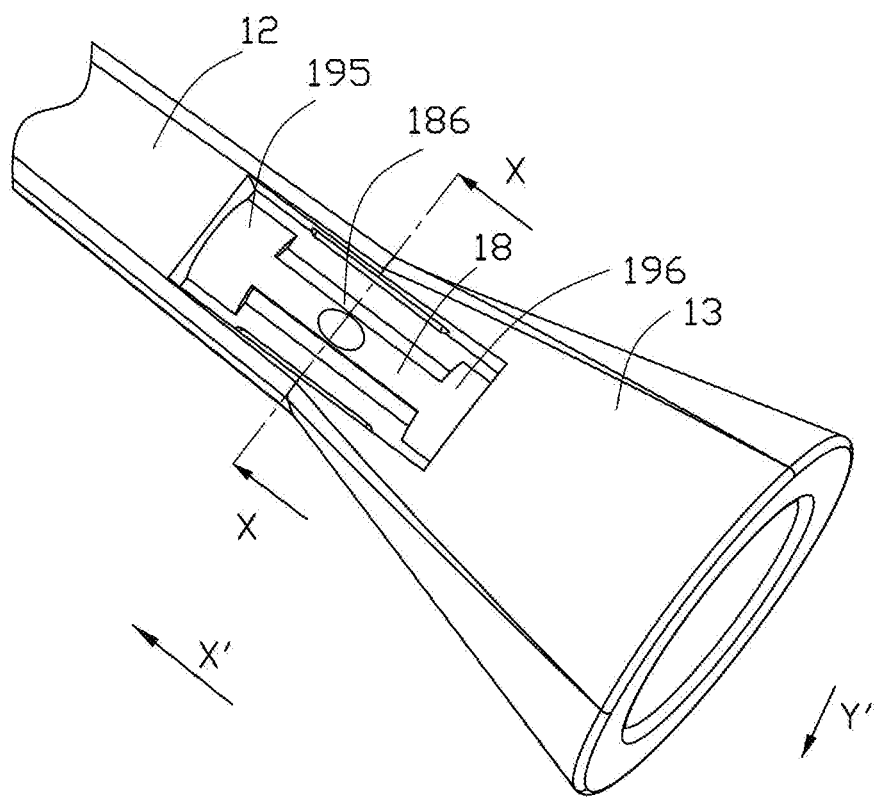
FIG. 9 is a partial view of the main body of another embodiment of the brush head according to the present disclosure.

Referring to FIGS. 6, 9, and 14, a vertical distance D5 between the third inner wall 194 of the accommodating cavity 19 and an end surface of the insertion portion 13 away from the neck portion 12 is in the range of 5-19 mm, for example 8 mm, 12.3 mm, 15 mm etc. A first arc groove 531 is formed on the second side wall 53, and a second arc groove 541 is formed on the third side wall 54. A first mounting portion 195 and a second mounting portion 196 are provided at both ends of the abutting wall 18 in the accommodating cavity 19, so as to be able to stably receive the engaging member 50 in the accommodating cavity 19.

An angle between the first mounting portion 195 and the abutment wall 18 and an angle between the second mounting portion 196 and the abutment wall 18 are right angles. In other embodiments, corners formed between the first mounting portion 195 and the second mounting portion 196 and the abutment wall 18 may also be arc-shaped, which is not specifically limited by examples provided in the present disclosure.

With reference to FIG. 14, a length L1 of the accommodating groove 51 in the engaging member 50 is in the range of 8 to 15 mm, for example 10 mm, 11 mm, 13 mm etc. A height H1 of the first side wall 52 is in the range of 1.0 to 2.0 mm, for example 1.4 mm, 1.8 mm etc.

The size of the accommodating groove 51 matches the size of the elastic member 30, which is not limited to the examples provided herein. The dimensions of the engaging member 50 and the accommodating cavity 19 may be adjusted.

In the present embodiment, the engaging member 50 includes a third surface 55 and a fourth surface 56 as shown in FIG. 13. The third surface 55 and the fourth surface 56 form an obtuse angle therebetween. In the assembled state, the third surface 55 and the first surface 121 are flushed (e.g., see FIG. 3 with FIG. 13), the fourth surface 56 and the second surface 131 are flushed. As such, the outer surface of the engaging member 50 and the outer surface of the brush head main body 10 are flushed, and the overall appearance of the electric toothbrush brush head 100 will not be affected.

The receiving cavity 14 is provided in the neck portion 12 and the insertion portion 13, and the abutment wall 18 and the accommodating cavity 19 are symmetrical with respect to a plane 21 of a boundary line 20 between the neck portion 12 and the insertion portion 13.

When assembling the brush head 100 of the electric toothbrush 300, the elastic member 30 is first placed in the accommodating groove 51 of the engaging member 50, and then the engaging member 50 is engaged in the accommodating cavity 19.

The electric toothbrush brush head 100 provided by the present disclosure includes the brush head main body 10 that is provided with a receiving cavity 14 along the first direction X, and the receiving cavity 14 receives at least a part of the drive shaft 250. The brush head main body 10 includes the cavity wall 17 and the abutment wall 18 for forming the receiving cavity 14. When the electric toothbrush brush head 100 is in the assembled state, the abutment wall 18 abuts at least a part of the drive shaft 250. The elastic member 30, which is arranged opposite to the abutment wall 18 so as to abut the abutment wall 18 along the direction of the outer surface of the cavity wall 17 toward the inner surface thereof to provide the abutment wall 18 with the external force to abut the drive shaft 250.

The electric toothbrush brush head 100 provided by the present disclosure abuts the abutment wall 18 through the elastic member 30, which may provide the abutment wall 18 with the external force to abut the drive shaft 250. In this way, the brush head main body 10 and the handle 200 are connected, and the handle 200 drives the vibration of the electric toothbrush brush head 100. The structure for connecting the brush head main body 10 and the handle 200 is simple, and no additional connecting pieces are required. Therefore, the electric toothbrush brush head 100 has a simple structure, is easy to manufacture, and has low manufacturing costs.

In addition, the electric toothbrush brush head 100 of the present disclosure is directly attached to the handle 200 of the electric toothbrush 300, and no additional connecting pieces are required. In this way, only the connection between the electric toothbrush brush head 100 and the handle 200 needs to be considered during the assembly process. The connection to the electric toothbrush 300 may effectively prevent the electric toothbrush brush head 100 from falling off and any offset between the electric toothbrush brush head 100 and the handle 200, thus providing the stability and aesthetics of the electric toothbrush 300 during use.

Even though information and advantages of the present exemplary embodiments have been set forth in the foregoing description, together with details of the structures and functions of the present exemplary embodiments, the disclosure is only for illustrative purposes. Changes may be made in detail, especially in matters of shape, size, and arrangement of parts within the principles of the present exemplary embodiments to the full extent indicated by the plain meaning of the terms in which the appended claims are expressed.

An embodiment of the present disclosure has the following features:

(1) In the electric toothbrush brush head according to an embodiment of the present disclosure, an electric toothbrush brush head detachably attached to a handle of an electric toothbrush, the handle including a vibrating drive shaft extending from the handle, the electric toothbrush brush head comprising: a brush head main body including a receiving cavity along a first direction receiving at least a part of the drive shaft, wherein the first direction is along an end of the brush head main body connected to the handle toward another end of the brush head main body away from the handle, the receiving cavity includes a cavity wall and an abutment wall integrally formed with the cavity wall, and when the electric toothbrush brush head is in an assembled state, the abutment wall abuts at least a part of the drive shaft under an external force; and an elastic member, at a position corresponding to the abutment wall, abutting the abutment wall along an outer surface of the cavity wall toward an inner surface of the cavity wall so as to provide the abutment wall with the external force to abut the drive shaft.

In the present embodiment, the electric toothbrush brush head provided by the present disclosure abuts the abutment wall through the elastic member, which may provide the abutment wall with the external force to abut the drive shaft. With the elastic member, when the drive shaft of the handle is inserted into the receiving cavity, the friction force between the abutment wall and the drive shaft may be effectively increased, so that the electric toothbrush brush head may be firmly connected to and may prevent easily falling off from the handle, and the cushioning force caused by the elastic member may effectively reduce noise. In addition, by the cooperation of the elastic member and the abutment wall, the drive shaft is firmly engaged in the receiving cavity, so that the drive shaft and the convex portion of the abutment wall fit more closely, thus improving the vibration performance of the electric toothbrush brush head.

In addition, the electric toothbrush brush head of the present disclosure is directly attached to the handle of the electric toothbrush, and no additional connecting pieces and other structures are required. Therefore, only the connection between the electric toothbrush brush head and the handle need to be considered during the assembly process, which effectively prevents the offset between the electric toothbrush brush head and the handle, thereby providing the stability and aesthetics of the electric toothbrush during use. Moreover, in the present embodiment, the brush head main body is integrally molded, that is, the abutment wall and the cavity wall are integrally formed, which may effectively simplify the manufacturing process and reduce the manufacturing costs.

(2) In the electric toothbrush brush head according to (1), an accommodating cavity is provided to an outer surface of the brush head main body, the abutment wall is provided between the accommodating cavity and the receiving cavity, the electric toothbrush brush head further includes an engaging member, the engaging member is accommodated in the accommodating cavity, the engaging member has an accommodating groove accommodating the elastic member, and the elastic member has a sheet structure, and two ends of the sheet structure abut against two ends of the accommodating groove.

In the present embodiment, such a structure allows the elastic member to generate a sufficient resilience force when it is subjected to force.

(3) In the electric toothbrush brush head according to (1), the elastic member is in the shape of a curved sheet, has a first curved surface portion, two second curved surface portions, and two flat surface portions, wherein the two second curved surface portions are respectively located at two ends of the first curved surface portion, the two flat surface portions are respectively located at two ends of the two second curved surface portions away from the first curved surface portion, and the first curved surface portion and the second curved surface portions are arc-shaped.

In the present embodiment, by selecting such a shape, the use of the above-mentioned elastic member provides the elastic force of the elastic member and the engaging strength between the brush head 100 and the drive shaft 250, which prevents the electric toothbrush brush head from falling off from the handle in practical applications. The electronic toothbrush provided by the disclosure has a stable and low-noise vibration as well as a long-life span.

(4) In the electric toothbrush brush head according to (3), the first curved surface portion and the second curved surface portions are curved in opposite directions.

In the present embodiment, the elasticity of the elastic member and the engaging strength between the brush head and the drive shaft prevent the electric toothbrush head from falling off from the handle in practical applications, maintains stable vibration, therefore reduces vibration noise, and increases durability and longevity.

(5) In the electric toothbrush brush head according to an embodiment of the present disclosure, an electric toothbrush brush head according to (3), wherein a radius of an arc of the first curved surface portion is located is in the range of 2-10 mm, and a first central angle corresponding to the first curved surface portion is in the range of 38-48 degrees, and a radius of an arc of the second curved surface portion is located is in the range of 3-10 mm, and a second central angle corresponding to the second curved surface portion is in the range of 15-30 degrees.

In the present embodiment, by selecting such a shape, the use of the above-mentioned elastic member provides the elastic force of the elastic member and the engaging strength between the brush head and the drive shaft, which prevents the electric toothbrush brush head from falling off from the handle in practical applications. The electronic toothbrush of the present disclosure provides stable and low-noise vibrations as well as a long-life span.

(6) In the electric toothbrush brush head according to (1), a material of the elastic member is beryllium copper or stainless steel.

In the present embodiment, by selecting the above-mentioned materials, the elastic force of the elastic member can be ensured as well as the engaging strength.

(7) In the electric toothbrush brush head according to an embodiment of the present disclosure, two sides of the abutment wall are connected to the cavity wall through an isolation layer, and a thickness of the isolation layer is smaller than a thickness of the abutment wall.

In the present embodiment, with such an isolation layer of the above-mentioned size provided between the abutment wall and the cavity wall, the vibration of the abutment wall may not be affected, and foreign matters such as water and dust in the accommodating cavity may be further prevented from entering the receiving cavity.

(8) In the electric toothbrush brush head according to an embodiment of the present disclosure, the thickness of the isolation layer is in the range of 0.05 to 2.0 mm, and the thickness of the abutment wall is in the range of 0.1 to 2.0 mm.

In the present embodiment, with such an the isolation layer of the above-mentioned size between the abutment wall and the cavity wall, the vibration of the abutment wall may not be affected, and foreign matters such as water and dust in the accommodating cavity may be further prevented from entering the receiving cavity.

(9) In the electric toothbrush brush head according to (1), the abutment wall includes a first wall surface facing the receiving cavity and a convex portion protruding from the first wall surface of the abutment wall for abutting the drive shaft.

In the present embodiment, the convex portion protrudes on the first wall surface of the abutment wall, and when the elastic force of the elastic member forces toward the abutment wall, the abutment wall may use the applied elastic force to lock the drive shaft. In this way, the electric toothbrush brush head is prevented from falling off, and the vibration thereof remains stable and quiet.

(10) In the electric toothbrush brush head according to an embodiment of the present disclosure, an electric toothbrush brush head according to (9), wherein the abutment wall further includes a second wall surface opposite to the first wall surface and facing away from the receiving cavity and a concave portion recessed from the second wall surface of the abutment wall for abutting the elastic member, and the convex portion is placed correspondingly to the concave portion.

In the present embodiment, at least a part of the elastic member abuts the concave portion on the second wall surface so that the elastic force of the elastic member may be directed at the concave portion of the abutment wall, and the abutment wall may also use the applied elastic force to lock the drive shaft. In this way, the electric toothbrush brush head is prevented from falling off, and the vibration thereof remains stable and low-noise.

(11) In the electric toothbrush brush head according to an embodiment of the present disclosure, an electric toothbrush brush head according to (10), wherein the drive shaft includes a first metal portion having a pattern for abutting the convex portion.

In the present embodiment, the drive shaft has a first metal portion having a pattern that the convex portion abuts, which enhances friction between the drive shaft and the electric toothbrush brush head so as to increase a connection therebetween.

In the electric toothbrush brush head according to (2), the accommodating cavity has two opposite first inner walls, an engaging portion protrudes from each of the first inner walls along the first direction, the engagement member has two opposite first side walls, outer surfaces of the two opposite first side walls each have an engaging groove, and the engaging portion is engaged in the engaging groove.

In the present embodiment, as such, the engaging member may be easily and firmly engaged in the accommodating cavity.

(13) In the electric toothbrush brush head according to an embodiment of the present disclosure, an electric toothbrush brush head according to (12), wherein a length of the engaging groove of the engaging member ranges from 5 mm to 13 mm, and a width of the engaging groove ranges from 0.2 mm to 1.5 mm.

In the present embodiment, with such size, the engaging member may be firmly engaged in the accommodating cavity.

(14) In the electric toothbrush brush head according to (12), the accommodating cavity has a second inner wall and a third inner wall opposite each other, the engaging member has a second side wall and a third side wall opposite each other, an outer surface of the second side wall facing the second inner wall, an outer surface of the third side wall facing the third inner wall, the second inner wall and the third inner wall are obliquely arranged in a second direction and close to each other, wherein the second direction is in a direction from an outer surface of the accommodating cavity provided in the brush head main body towards an interior of the brush head main body, the second side wall and the second inner wall are inclined, the third side wall and the third inner wall are inclined.

In the present embodiment, such inclined arrangements may play a certain guiding role, thereby facilitating assembly, expediting the installation speed, and reducing the assembly cost. In alternative embodiments, the first inner wall and the second inner wall may not be inclined but are not limited to examples provided herein.

(15) In the electric toothbrush brush head according to an embodiment of the present disclosure, an electric toothbrush brush head according to (12), wherein the two first inner walls of the accommodating cavity are arranged obliquely along the second direction and close to each other, the first side walls and the first inner walls are arranged obliquely, wherein the second direction is in a direction from an outer surface of the accommodating cavity provided in the brush head main body towards an interior of the brush head main body.

In the present embodiment, such inclined arrangements may play a certain guiding role, thereby facilitating assembly, expediting the installation speed, and reducing the assembly cost. In alternative embodiments, the first inner wall and the second inner wall may not be inclined but are not limited to examples provided herein.

(16) In the electric toothbrush brush head according to (15), the accommodating cavity has a second inner wall and a third inner wall opposite each other, the engaging member has a second side wall and a third side wall opposite each other, an outer surface of the second side wall facing the second inner wall, an outer surface of the third side wall facing the third inner wall, the second inner wall and the third inner wall are obliquely arranged in a second direction and close to each other, wherein the second direction is in a direction from an outer surface of the accommodating cavity provided in the brush head main body towards an interior of the brush head main body, the second side wall and the second inner wall are obliquely arranged, the third side wall and the third inner wall are obliquely arranged.

In the present embodiment, such inclined arrangements may play a certain guiding role, thereby facilitating assembly, expediting the installation speed, and reducing the assembly cost. In alternative embodiments, the first inner wall and the second inner wall may not be inclined but are not limited to examples provided herein.

(17) In the electric toothbrush brush head according to (1), wherein the brush head main body has a first receiving chamber and a second receiving chamber along the first direction, the receiving cavity and the second receiving chamber are respectively located at two ends of the first receiving chamber, and the first receiving chamber and the second receiving chamber respectively receive a metal rod and a fixing portion of the handle.

(18) In the electric toothbrush brush head according to (17), the metal rod does not contact a wall surface of the first receiving chamber and the fixing portion does not contact a wall surface of the second receiving chamber of the drive shaft.

The present embodiment may prevent the drive shaft from driving the electric toothbrush brush head to vibrate.

(19) In the electric toothbrush brush head according to an embodiment of the present disclosure, an electric toothbrush brush head according to (1), wherein the brush head main body is made of ABS plastic, PP plastic or POM plastic.

In the present embodiment, such materials may increase the safety and the elasticity of the brush head main body.

(20) An electric toothbrush according to an embodiment of the present disclosure, the electric toothbrush comprising the electric toothbrush brush head and the handle according to (1), wherein the electric toothbrush brush head is detachably attached to the handle.

In the present embodiment, the electric toothbrush brush head provided by the present disclosure abuts the abutment wall through the elastic member, which may provide the abutment wall with the external force to abut the drive shaft. In this way, with the elastic member, when the drive shaft of the handle is inserted into the receiving cavity, the friction force between the abutment wall and the drive shaft may be effectively increased, so that the electric toothbrush brush head may be more firmly connected to and not easily fall off, and the cushioning force caused by the elastic member may effectively reduce noise. In addition, with the elastic member and the abutment wall, the drive shaft is locked, so that the drive shaft and the convex portion of the abutment wall fit more closely, thus improving the vibration performance of the electric toothbrush brush head.

In addition, the electric toothbrush brush head of the present disclosure is directly attached to the handle of the electric toothbrush, and no additional connecting pieces and other structures are required. Therefore, only the connection between the electric toothbrush brush head and the handle need to be considered during the assembly process, which effectively prevents the offset between the electric toothbrush brush head and the handle, thus providing the stability and aesthetics of the electric toothbrush during use. Moreover, in the present embodiment, the brush head main body is integrally moulded, that is, the abutment wall and the cavity wall are integrally formed, which may effectively simplify the manufacturing process and reduce the manufacturing costs.

What is claimed is:

1. An electric toothbrush brush head detachably attached to a handle of an electric toothbrush, the handle including a vibrating drive shaft extending from the handle, the electric toothbrush brush head comprising:
    a brush head main body including a receiving cavity along a first direction receiving at least a part of the drive shaft, wherein the first direction is along an end of the brush head main body connected to the handle toward another end of the brush head main body away from the handle, the receiving cavity includes a cavity wall and an abutment wall integrally formed with the cavity wall, and when the electric toothbrush brush head is in an assembled state, the abutment wall abuts at least a part of the drive shaft under an external force; and
    an elastic member positioned corresponding to the abutment wall, wherein the elastic member abuts the abutment wall along an outer surface of the cavity wall toward an inner surface of the cavity wall so as to provide the abutment wall with the external force to abut the drive shaft.

2. The electric toothbrush brush head according to claim 1 wherein:
    an accommodating cavity is provided to an outer surface of the brush head main body, the abutment wall is provided between the accommodating cavity and the receiving cavity,
    the electric toothbrush brush head further includes an engaging member, the engaging member is accommodated in the accommodating cavity, the engaging member has an accommodating groove accommodating the elastic member, and
    the elastic member has a sheet structure, and two ends of the sheet structure abut against two ends of the accommodating groove.

3. The electric toothbrush brush head according to claim 2, wherein:
    the accommodating cavity has two opposite first inner walls, an engaging portion protrudes from each of the first inner walls along the first direction, the engagement member has two opposite first side walls, outer surfaces of the two opposite first side walls each have an engaging groove, and the engaging portion is engaged in the engaging groove.

4. The electric toothbrush brush head according to claim 3, wherein:
    a length of the engaging groove of the engaging member ranges from 5 mm to 13 mm, and a width of the engaging groove ranges from 0.2 mm to 1.5 mm.

5. The electric toothbrush brush head according to claim 3, wherein:
    the accommodating cavity has a second inner wall and a third inner wall opposite each other, the engaging member has a second side wall and a third side wall opposite each other, an outer surface of the second side wall faces the second inner wall, an outer surface of the third side wall faces the third inner wall, the second inner wall and the third inner wall are obliquely arranged in a second direction and close to each other, wherein the second direction is in a direction from an outer surface of the accommodating cavity provided in the brush head main body towards an interior of the brush head main body, the second side wall and the second inner wall are obliquely arranged, the third side wall and the third inner wall are obliquely arranged.

6. The electric toothbrush brush head according to claim 3, wherein:
    the two first inner walls of the accommodating cavity are arranged obliquely along the second direction and close to each other, the first side walls and the first inner walls are arranged obliquely, wherein the second direction is in a direction from an outer surface of the accommodating cavity provided in the brush head main body towards an interior of the brush head main body.

7. The electric toothbrush brush head according to claim 6, wherein:
    the accommodating cavity has a second inner wall and a third inner wall opposite each other, the engaging member has a second side wall and a third side wall opposite each other, an outer surface of the second side wall faces the second inner wall, an outer surface of the third side wall faces the third inner wall, the second inner wall and the third inner wall are obliquely arranged in a second direction and close to each other, wherein the second direction is in a direction from an outer surface of the accommodating cavity provided in the brush head main body towards an interior of the brush head main body, the second side wall and the second inner wall are obliquely arranged, the third side wall and the third inner wall are obliquely arranged.

8. The electric toothbrush brush head according to claim 1, wherein:
    the elastic member, in a shape of a curved sheet, has a first curved surface portion, two second curved surface portions, and two flat surface portions, wherein the two second curved surface portions are respectively located at two ends of the first curved surface portion, the two flat surface portions are respectively located at two ends of the two second curved surface portions away from the first curved surface portion, and the first curved surface portion and the second curved surface portions are arc-shaped.

9. The electric toothbrush brush head according to claim 8, wherein:
    the first curved surface portion and the second curved surface portions are curved in opposite directions.

10. The electric toothbrush brush head according to claim 8, wherein:
    a radius of an arc of the first curved surface portion is in the range of 2-10 mm, and a first central angle corresponding to the first curved surface portion is in the range of 38-48 degrees, and a radius of an arc of the second curved surface portion is in the range of 3-10 mm, and a second central angle corresponding to the second curved surface portion is in the range of 15-30 degrees.

11. The electric toothbrush brush head according to claim 1, wherein:
    a material of the elastic member is beryllium copper or stainless steel.

12. The electric toothbrush brush head according to claim 1, wherein:
    two sides of the abutment wall are connected to the cavity wall through an isolation layer, and a thickness of the isolation layer is smaller than a thickness of the abutment wall.

13. The electric toothbrush brush head according to claim 12, wherein:
    the thickness of the isolation layer is in the range of 0.05 to 2.0 mm, and the thickness of the abutment wall is in the range of 0.1 to 2.0 mm.

14. The electric toothbrush brush head according to claim 1, wherein:
    the abutment wall includes a first wall surface facing the receiving cavity and a convex portion protruding from the first wall surface of the abutment wall for abutting the drive shaft.

15. The electric toothbrush brush head according to claim 14, wherein:
the abutment wall further includes a second wall surface opposite to the first wall surface and facing away from the receiving cavity and a concave portion recessed from the second wall surface of the abutment wall for abutting the elastic member, and the convex portion is placed correspondingly to the concave portion.

16. The electric toothbrush brush head according to claim 15, wherein:
the drive shaft includes a first metal portion having a pattern for abutting the convex portion.

17. The electric toothbrush brush head according to claim 1, wherein:
the brush head main body has a first receiving chamber and a second receiving chamber along the first direction, the receiving cavity and the second receiving chamber are respectively located at two ends of the first receiving chamber, and the first receiving chamber and the second receiving chamber respectively receive a metal rod of the handle and a fixing portion of the handle.

18. The electric toothbrush brush head according to claim 17, wherein:
the metal rod does not contact a wall surface of the first receiving chamber and the fixing portion does not contact a wall surface of the second receiving chamber of the drive shaft.

19. The electric toothbrush brush head according to claim 1, wherein:
the brush head main body is made of ABS plastic, PP plastic or POM plastic.

20. An electric toothbrush comprising the electric toothbrush brush head and the handle according to claim 1, wherein the electric toothbrush brush head is detachably attached to the handle.

\* \* \* \* \*